April 25, 1939.                W. E. HULL                2,155,712
                             MAGNETIC COMPASS
                            Filed April 6, 1936
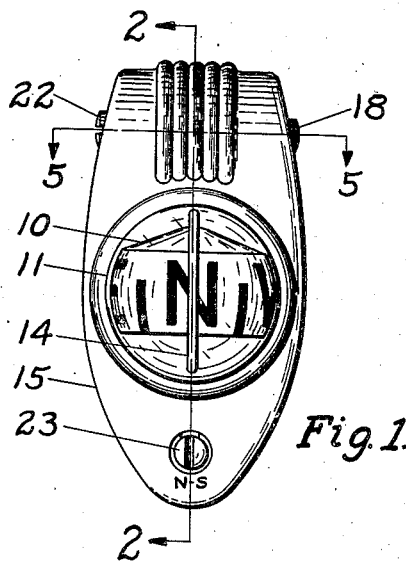
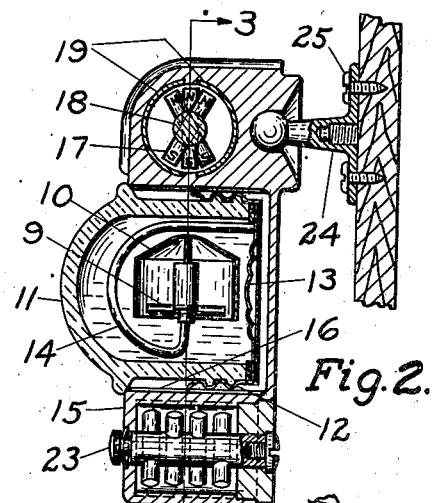
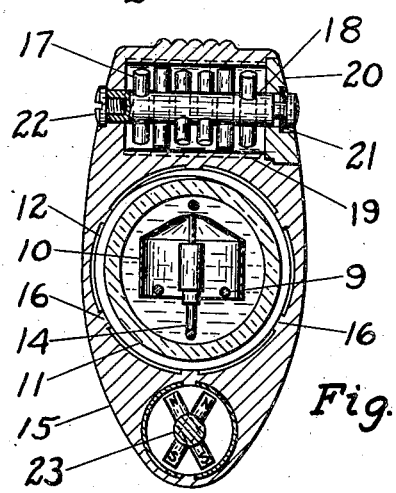
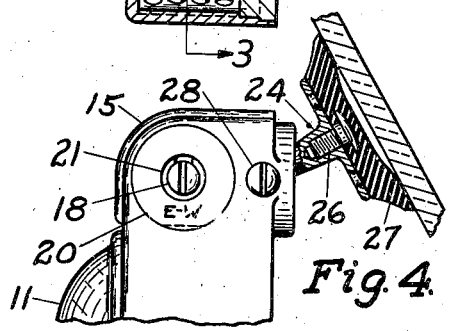
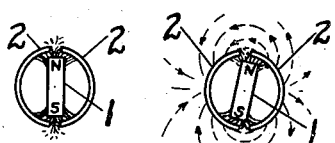
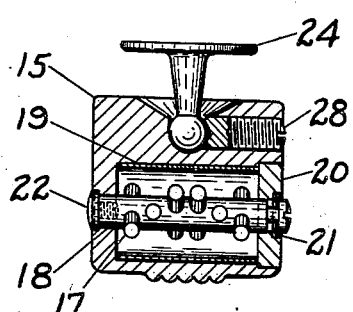
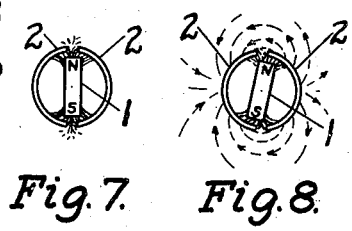
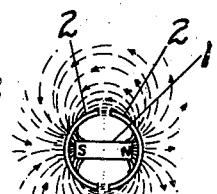
Inventor
Walter E. Hull Patented Apr. 25, 1939

2,155,712

UNITED STATES PATENT OFFICE 2,155,712

MAGNETIC COMPASS

Walter E. Hull, Warren, Ohio

Application April 6, 1936, Serial No. 72,895

13 Claims. (Cl. 33—225)

My invention relates to magnetic compasses for determining the direction of travel of automobiles, boats, aircraft and the like. It relates more particularly to compensating devices for correcting semicircular deviation.

An object of my invention is to provide a compensating magnetic field, the strength of which may be varied by rotating a magnetic element in a substantially vertical plane and shielding the vertical component of the rotatable field to prevent tilting of the compass card, in positions where one pole is nearer the card than the other.

Other objects are to provide a compass with universal mounting means, attractive design and simple construction to facilitate economy in manufacturing.

Referring to the drawing, Figures 1 to 5, inclusive, show a preferred form of my invention, using two compensating units which act at right angles to each other.

Figure 1 shows a front view of the compass.

Figure 2 is a cross-section taken on the line 2—2 of Figure 1, showing the compass mounted on a vertical panel.

Figure 3 shows a section taken on the line 3—3 of Figure 2.

Figure 4 is a partial side view showing a vacuum cup mounting on a sloping glass surface such as an automobile windshield.

Figure 5 is a section taken on the line 5—5 of Figure 1.

Figure 6 shows another form of my invention using a single compensating unit which may be rotated about a vertical axis.

Figures 7, 8 and 9 are diagrams illustrating the principle of the compensating unit.

It is well known that magnetic compasses mounted in automobiles, boats, aircraft and the like are affected by local magnetism from steel and electrical equipment. To make a compass operate correctly under these conditions, it is necessary to compensate the horizontal component of this local magnetic field with an opposing parallel field of the same strength. It is obvious that means must be provided for varying both the direction and the strength of this compensating field.

In my present invention, a magnetic element is mounted above or below the compass dial, or both. The compensating field is the horizontal component of the field from the magnetic element. The strength of the horizontal component is varied by rotating the magnetic element in a vertical plane. Obviously, in positions where one pole of the magnetic element is nearer the compass card than the other, there is a vertical component which has a tendency to tilt the compass card. To reduce this vertical component to a negligible force, I use shields of soft iron or other highly permeable metal.

The magnetic action of the compensating magnet and the shields may be better understood by referring to the drawing.

Figure 7 shows the neutral position. The permanent magnet 1 is in a vertical position. Most of the magnetic flux flows from one pole through the highly permeable shields 2 to the other pole. Any slight leakage will be vertical and will not noticeably affect the compass card.

Figure 8 shows the magnet 1 slightly rotated to the right. Due to the position of the gaps between the shields 2, part of the magnetic flux will flow outside of the shields producing a slight external field as shown.

Figure 9 shows the position where the maximum external field occurs.

If the magnet 1 is rotated to the left from the position shown in Figure 7, an external field will be produced, flowing in the opposite direction from that shown in Figures 8 and 9.

Figure 6 shows one practical embodiment of my invention. A compass card 3 is pivotally supported within a casing 4. A single compensating unit is used consisting of a permanent magnet 5, semicircular shields 6 of highly permeable metal, a housing 7 which is rotatable about a vertical axis, and a clamping ring 8.

To compensate the compass, the housing 7 is rotated about its vertical axis until the horizontal component of the field from the magnet 5 is parallel to the horizontal component of the local magnetic field. The magnet 5 is then rotated in a vertical plane until the strength of the compensating field in the vicinity of the compass card is equal and opposite to the strength of the local magnetic field.

Figures 1 to 5 inclusive show a preferred form of my invention. Permanent magnets 9 are secured within a compass card 10. A casing adapted to be filled with a liquid comprises a transparent, dome shaped part or cup member 11, with its open end threaded and a screw cap 12 which is of any suitable non-magnetic metal. A diaphragm 13 allows for expansion and contraction of the liquid due to variation in temperature. The wire 14 serves as a combined lubber line and a means for pivotally supporting the compass card 10 within the casing. This compass unit is pressed into a cylindrical cavity, in a body or housing 15, which is of any suitable material such as phenolic resinous material. Raised ribs 16 are provided to frictionally engage the screw cap 12. A cylindrical cavity extending crosswise is provided in the upper part of the housing 15 for a compensating unit. This compensating unit comprises a plurality of permanent magnets 17, a shaft 18, cross drilled to accommodate the permanent magnets, and a pair of semicircular complemental shields 19 of soft sheet iron or other highly permeable metal. The shaft 18 is centered by the cap 20 which is preferably of the same material as the housing 15. The cap 20 is held in place by a U-shaped spring washer 21. The washer 21 fits into the annular groove in the shaft 18. The spring washer 21 also provides a frictional means for holding the compensating unit in adjustment. The shaft 18 is held in place endwise by a screw 22. The end of the shaft 18 nearest the annular groove is provided with a slot to facilitate turning the shaft for the purpose of adjustment. The lower part of the housing 15 is provided with a cavity to accommodate a second compensating unit which operates at right angles to the upper compensating unit. Its construction is similar to that of the upper compensating unit, except that fewer permanent magnets are necessary due to its position being nearer the compass card magnets 9. In order to make the increase in the strength of the compensating field more even as the shaft 18 is rotated from the neutral position, the magnets 17 are spirally mounted in the shaft. Obviously, the poles of the magnets 17 do not all pass the gaps between the shields 19 at the same position of the shaft. This makes the adjustment near the neutral position less sensitive. To provide a balanced magnetic condition, half of the magnets are spiraled to the right and half to the left. The neutral position occurs where the resultant of the fields from the magnets 17 is vertical. The maximum compensating field occurs when the resultant field is horizontal.

To explain the operation of the compensating units, I shall consider the compass as being mounted in an automobile. The horizontal component of the local magnetic field may be considered as comprising a lateral component and a longitudinal component. The longitudinal component is neutralized by the field from the upper compensating unit. The lateral component is neutralized by the field from the lower compensating unit. The adjustment may be accomplished by first heading the automobile north and rotating the shaft 23 to the position where the compass reads north. The automobile may then be headed east and the shaft 18 rotated to the position where the compass reads east. Corrections for the north and south compass readings are made by rotating the shaft 23. East and west corrections are made by rotating the shaft 18.

Another feature of the compass shown is a novel universal bracket for mounting the compass. It permits mounting the compass on an oblique angled surface such as a header board of an automobile, by means of screws. It also provides a detachable vacuum cup for mounting on a smooth surface such as a straight or sloping V windshield. The bracket 24 comprises a disc and a ball connected by a tapered shank. It may be of any suitable metal such as brass. The disc is provided with holes to accommodate screws 25 and a tapped hole to accommodate the screw insert 26 in the rubber vacuum cup 27. The housing 15 is provided with a cavity suitable to accommodate the ball on the bracket 24. A set screw 28 is provided with a cupped end which frictionally engages the ball on the bracket 24, thereby providing means for locking the bracket in any desired position.

While the drawing illustrates but two forms of my invention, I do not wish to be limited to the construction shown as it is obvious that various changes could be made without departing from the scope of the invention.

I claim:

1. A compensating device for compasses comprising a compensating magnet, mounting means providing for rotation of said compensating magnet about a transverse axis thereof and in a substantially vertical plane and shielding means comprising spaced shield sections disposed relative to said compensating magnet to reduce the vertical force component of the external field compensating magnet, said shield sections being disposed to surround the compensating magnet with their adjacent edges spaced apart to define slots lying in a vertical plane extending through said transverse axis.

2. A compass unit comprising a transparent, dome-shaped, threaded casing, a threaded cap for said casing and forming therewith a compass unit, and a compass card within said casing, a housing having substantially cylindrical cavities adapted to receive respectively said compass unit and a compensating means, compensating means within one cavity of said housing, and ribs within said other cylindrical cavity to frictionally engage said threaded cap.

3. In a magnetic compass, a body having a recess therein, and a compass unit disposed in said recess comprising a transparent cup member having a cap applied thereto to close the open end and a card pivotally supported in said cup member, said body having spaced projections extending axially of the recess on the inner wall thereof and engaged by said cap for retaining said unit in the recess.

4. In a magnetic compass, a body having a cavity extending thereinto from the front thereof and an elongated cavity therein with its axis lying substantially horizontal and vertically offset from the axis of the first mentioned cavity, a compass unit in the first cavity comprising a casing having a transparent wall and a pivoted card therein, a highly permeable substantially cylindrical shield disposed in and forming a lining for said elongated cavity, said shield comprising sections disposed with edges thereof spaced apart to form vertically spaced slots, and a compensating magnet within said elongated cavity and surrounded by said shield.

5. In a magnetic compass, a body having a cavity extending thereinto from the front thereof and a laterally elongated cavity therein above the first mentioned cavity, a compass unit in the first cavity comprising a transparent wall and a pivoted card inwardly thereof, a highly permeable shield in the second cavity comprising correspondingly elongated, opposed shield sections disposed with portions thereof spaced to form a slot-like opening in the shield at the side thereof nearest the compass unit, a rotatable shaft disposed substantially coaxially of said second cavity, and a plurality of permanent magnets carried by said shaft and extending transversely of said second cavity between said shield sections.

6. In a magnetic compass, a body having a main cavity extending thereinto from the front thereof and also having elongated cavities therein above and below the main cavity and disposed with their axes extending substantially horizontal and at right angles to each other, a compass unit in said main cavity comprising a transparent wall and a pivoted card inwardly thereof, a highly permeable shield in each elongated cavity comprising opposed shield sections disposed with adjacent edges thereof spaced to form a slot-like opening in the shield at the side thereof nearest the compass unit, and a permanent magnet in each elongated cavity between the shield sections thereof and supported for rotative adjustment about its transverse axis.

7. In a magnetic compass, a body having a main cavity extending thereinto from the front thereof and also having elongated cavities therein above and below the main cavity and disposed with their axes extending substantially horizontal and at right angles to each other, a compass unit in said main cavity comprising a transparent wall and a pivoted card inwardly thereof, a highly permeable shield in each elongated cavity comprising substantially semicylindrical complemental shield elements having their adjacent edges spaced apart to form vertically spaced horizontally extending slots, a rotatable shaft supported in each elongated cavity substantially coaxially of the shield thereof, and a plurality of permanent magnets carried by each shaft and extending transversely of the shaft.

8. In a magnetic compass a body having substantially cylindrical cavities extending thereinto, a compass unit in one cavity comprising a transparent cup member and a pivoted card therein, complemental substantially semicylindrical shield elements disposed in said other cavity with their edges spaced apart to form vertically spaced horizontally extending slots, a rotatable shaft supported substantially coaxially of said other cavity, and a permanent magnet carried by said shaft and extending transversely of said other cavity between the shield elements thereof.

9. In a magnetic compass a body having a cavity and a pivoted card therein, said body also having an elongated cavity therein with its axis lying in a substantially horizontal plane which is vertically spaced from the card, and a shaft extending axially in said elongated cavity and carrying a compensating magnet, said shaft and body having cooperating portions whereby the shaft is rotatable in said cavity and adapted to be held in a desired position of adjustment including axially spaced thrust shoulders on the shaft one of which is a spring washer.

10. In a magnetic compass a body having a cavity and a pivoted card therein, said body also having an elongated cavity therein with its axis lying in a substantially horizontal plane which is vertically spaced from the card, a cover adapted to close one end of said elongated cavity and having an opening for substantial alignment with an opening in the opposite end wall of said elongated cavity, a shaft rotatably supported in such aligned openings and carrying a compensating magnet, a spring element interconnecting said cover and the corresponding end of said shaft, and a screw engaging the other end of the shaft and a portion of said body for tensioning said spring element and retaining the shaft against shifting.

11. A compensating device for compasses comprising a pair of highly permeable substantially semi-cylindrical shields having their edges separated to define a slotted horizontal cylinder with the slots in a vertical plane, a permanent magnet diametrically disposed between said shields, and means mounting said permanent magnet for rotation about an axis substantially coincident with the axis of said cylinder.

12. A compensating device for compasses comprising a pair of compensating units acting at right angles to each other, each of said compensating units comprising a pair of stationary highly permeable complemental substantially semi-cylindrical shields with their edges spaced to form a longitudinally slotted cylinder, a permanent magnet diametrically disposed between said shields, and means mounting said permanent magnet for rotation about the axis of said cylinder.

13. A compass compensating device comprising a pair of compensating units acting at right angles to each other, each compensating unit comprising a plurality of magnets with their ends disposed on a spiral about a common horizontal axis and with the center of each magnet lying substantially on said axis, said magnets being disposed at substantially right angles to said axis, and means providing for rotation of said magnets in substantially vertical planes about said common horizontal axis.

WALTER E. HULL.